Dec. 14, 1926. 1,611,144
A. C. HOPKINS
BEAD FOR PNEUMATIC TIRES AND REENFORCEMENT THEREFOR
Filed March 26, 1925
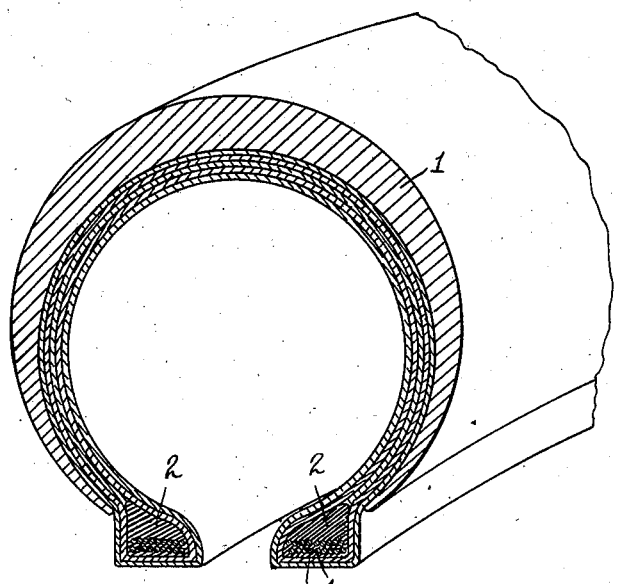
Fig. 1.
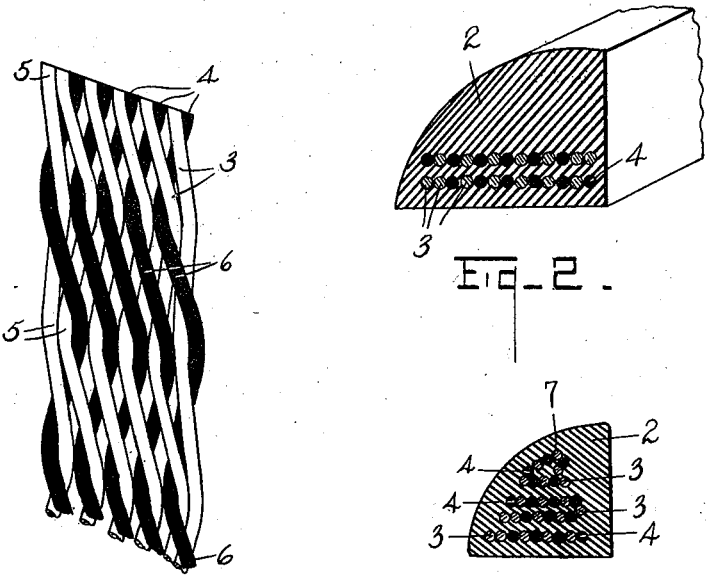
Fig. 2.
Fig. 3.
Fig. 4.
Inventor
Arthur C. Hopkins
By Chappell Dear
Attorneys Patented Dec. 14, 1926.

1,611,144

UNITED STATES PATENT OFFICE.

ARTHUR C. HOPKINS, OF NILES, MICHIGAN, ASSIGNOR TO NATIONAL STANDARD COMPANY, OF NILES, MICHIGAN.

BEAD FOR PNEUMATIC TIRES AND REENFORCEMENT THEREFOR.

Application filed March 26, 1925. Serial No. 18,453.

This invention relates to improvements in beads for pneumatic tires and reenforcements therefor.

The main objects of the invention are:

First, to provide an improved reenforced bead for pneumatic tires which is very strong.

Second, to provide an improved tire bead reenforcement which may be rapidly manufactured and is substantially non-stretchable.

Third, to provide an improved tire bead reenforcing strip which is substantially non-stretchable and at the same time may be conformed or folded longitudinally of the strip without placing stress upon the strands.

Objects pertaining to details and economies of my improvements will appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. 1 is a sectional perspective view of a tire embodying the features of my invention, parts being shown mainly in conventional form for convenience in illustration.

Fig. 2 is a fragmentary perspective view of a tire bead embodying the features of my invention, alternate strands being shown in black for convenience in illustration.

Fig. 3 is a perspective view of my improved tire bead reenforcing strip, alternate strands being shown in black for convenience in illustration.

Fig. 4 is a fragmentary perspective view of a tire bead illustrating another embodiment of my invention.

In the drawings, similar numerals of reference refer to similar parts in all of the views.

In Fig. 1 the tire casing 1 is shown conventionally and is adapted to receive the usual bead 2 which is formed of a suitable rubber composition, the bead being of a cross-section corresponding to the tire in which it is desired to use the same. Embedded in this composition is my improved tire bead reenforcement formed of strands of wire, which for convenience in illustration are shown in Figs. 2 and 3 with alternate white and black strands 3 and 4. It will be understood that these strands are of the same material and the coloring is used merely for the purpose of illustrating the braiding of the strands together.

The strands 3 and 4 are braided together with the several strands alternately and successively looped back and forth over the adjacent strands, that is, the strands at each side thereof, as is clearly shown in Figs. 2 and 3. The co-engaging loops 5 of the strands have relatively long reaches 6, the reaches of co-engaging loops lying in superimposed crossed contacting relation and the bights of the co-engaging loops being disposed in transverse alinement and in edge to edge contact. This results in a braid or strip which is substantially non-extensible both longitudinally and transversely, the bights and reaches of the loops being in contact so that the relative position of the strands does not materially change when the element is subjected to longitudinal stresses, at the same time the element is very flexible and may be rolled longitudinally upon itself as desired without placing undue stress upon any particular strand. Further, interstices are provided of relatively large size so that an effective bonding is secured with a rubber composition and inasmuch as the size and shape of the interstices is not materially changed by stresses, the tendency to loosen or break from the bonding is minimized. Inasmuch as the loops of the strands contact at their crossing points and the tendency of the strands is to maintain this contact, the braid is non-stretchable longitudinally, as to stretch it would necessitate contracting transversely and it is normally contracted substantially to the limit in this respect. The strip is also substantially non-stretchable transversely for the reason that all the wires being under uniform stress as woven or braided together and being in contact at their crossing points, stresses which would tend to stretch the strip transversely are distributed throughout and would necessitate shortening of the strip, all the strands acting to resist transverse expansion or widening of the strip.

I am aware of the practice of forming reenforce in which the strands of wire are braided together with the wire extending from edge to edge of the strip, but such strips or braids are transversely extensible unless the ends of the strands are positively gripped or held. My reenforcing strip is substantially non-extensible laterally or transversely of the strip and at the same time can be transversely conformed as shown in Fig. 4, where it is adapted to a narrow bead design, for use in certain types of tires, the two upper strips being transversely folded and the top strip 7 being substantially in the form of a roll. In practice the reenforcing element is convolutely disposed in the bead, two wraps only being shown in Fig. 2 while three are shown in Fig. 4.

My improved reenforcing element has the advantage of being capable of very rapid production; that is, the machines may be operated at high speed without injury to the product. I have illustrated my improvements mainly in conventional form but it is believed with sufficient detail to enable those skilled in the art to embody and adapt my improvements as may be desired.

Having thus described my invention what I claim as new and desire to secure by Letters Patent is:

1. An element of the class described comprising a plurality of strands of resilient wire braided together with the several strands alternately and successively looped back and forth with adjacent strands, the reaches of the loops being relatively long, the reaches of corresponding loops being disposed in crossed contacting relation so that each strand has direct looped bonding engagement with the strands at the sides thereof, the bights of the corresponding loops being alined and in edge to edge contact whereby the element is substantially non-expansible laterally and longitudinally and is capable of being rolled longitudinally upon itself.

2. A tire bead reenforcing element comprising a plurality of strands of resilient wire braided together with adjacent strands alternately and successively looped together with the corresponding reaches of their loops in crossed superimposed contacting relation and with their bights contacting from edge to edge of the element, the resiliency of the wire tending to maintain the parts in such contacting engagement.

3. A tire bead reenforcing element consisting of a plurality of strands of wire braided together with adjacent strands successively looped back and forth over the coacting strands at the sides thereof and with reaches of their loops disposed in superimposed crossed contacting relation and with their bights contacting providing interstices of relatively large and substantially fixed size and shape.

4. A tire bead reenforcing element consisting of a plurality of strands of wire braided together with the several strands alternately and successively looped back and forth with adjacent strands and with the reaches of their loops in superimposed crossed contacting relation and with the bights of their loops in edge to edge contacting relation.

5. An element of the class described comprising a plurality of strands braided together with the several strands alternately and successively looped back and forth with adjacent strands with the bights of the corresponding loops alined and with the reaches of corresponding loops in superimposed crossed relation so that each strand has direct looped bonding engagement with the strands at the sides thereof.

In witness whereof I have hereunto set my hand.

ARTHUR C. HOPKINS.